United States Patent [19]

Maeda et al.

[11] Patent Number: 5,325,348

[45] Date of Patent: Jun. 28, 1994

[54] WAVELENGTH CONVERTING ELEMENT AND SYSTEM FOR RECORDING AND REPRODUCING OPTICAL INFORMATION

[75] Inventors: Hideo Maeda, Yokohama; Eiji Noda, Kawasaki; Shigeru Ohuchida, Zama, all of Japan

[73] Assignee: Ricoh Company, Ltd., Tokyo, Japan

[21] Appl. No.: 878,421

[22] Filed: May 4, 1992

[30] Foreign Application Priority Data

Jun. 1, 1991 [JP] Japan .................................. 3-157778
Jul. 1, 1991 [JP] Japan .................................. 3-186874

[51] Int. Cl.$^5$ .............................................. G11B 7/08
[52] U.S. Cl. .............................. 369/100; 369/44.37; 369/110
[58] Field of Search ............... 369/103, 104, 116, 121, 369/44.24, 44.37, 44.38, 100, 110, 107, 112

[56] References Cited

U.S. PATENT DOCUMENTS

| | | | |
|---|---|---|---|
| 5,033,040 | 7/1991 | Fujita | 369/44.37 |
| 5,093,822 | 3/1992 | Kugiya et al. | 369/100 |
| 5,200,948 | 4/1993 | Goldberg et al. | 369/275.2 |
| 5,208,801 | 5/1993 | Finegan | 369/100 |
| 5,216,658 | 6/1993 | Clark | 369/100 |
| 5,231,624 | 7/1993 | Finegan | 369/116 |

OTHER PUBLICATIONS

Extended Abstracts (The 50th Autumn Meeting, 1989); The Japan Society of Applied Physics, No. 3, collection 27a-ZL-4, p. 807, Sep. 27, 1989, M. Fujino, et al., "Blue Light Generation By Diode-Pumped Nd:Yag Laser". Journal of the Optical Society of America B, vol. 3, No. 9, Sep. 1986, pp. 1175-1180, T. Baer, "Large-Amplitude Fluctuations Due To Longitudinal Mode Coupling In Diode-Pumped Intracavity-Doubled Nd:Yag Lasers".

*Primary Examiner*—Constantine Hannaher
*Assistant Examiner*—Don Wong
*Attorney, Agent, or Firm*—Oblon, Spivak, McClelland, Maier & Neustadt

[57] ABSTRACT

In a wavelength converting element, an oscillation line at a predetermined wavelength is excited on the basis of excited light having a predetermined wavelength. Frequencies of the excited light and light on the oscillation line are mixed with each other in a nonlinear optical medium to generate light having a sum frequency. The wavelength converting element has resonators for the oscillation line and the excited light. A system for recording and reproducing optical information has a first light source capable of being directly modulated, and a second light source for emitting light having a wavelength shorter than that of a light beam emitted from the first light source. The first beam from the first light source is superposed on the short wavelength light from the second light source to record and reproduce the optical information. This system uses an overwrite recording system in which a writing operation of data is performed by emitting and superposing a modulated light beam from the first light source on the short wavelength light, and data indicative of value "0" are equivalently written to a memory medium by erasing data therefrom in this writing operation.

18 Claims, 12 Drawing Sheets

SUM FREQUENCY

WAVELENGTH CONVERTING ELEMENT AND SYSTEM FOR RECORDING AND REPRODUCING OPTICAL INFORMATION

BACKGROUND OF THE INVENTION

1. Field of the Invention

The present invention relates to a wavelength converting element in which an oscillation line at a predetermined wavelength is excited by making a laser beam incident to a predetermined laser medium as excited light and frequencies of the excited light and light on the oscillation line are mixed with each other by a nonlinear optical medium to emit light having a sum frequency. The present invention also relates to a system for recording and reproducing optical information and used in an optical pickup, etc.

2. Description of the Related Art

For example, a known wavelength converting element is shown in a document entitled "Pre-original collection 27a-ZL-4", p. 807 published in a fiftieth scientific lecture meeting held by the Society of Applied Physics of Japan in 1987.

This wavelength converting element has a problem that light emitting efficiency of a sum frequency is low.

Namely, for example, the above wavelength converting element is designed such that a laser resonator formed between mirrors functions as a resonator with respect to light having a wavelength of 1064 nm and excited in a Nd:YAG laser medium. In this case, the light having the wavelength of 1064 nm is amplified by the laser resonator and has large power within this laser resonator. However, light having a wavelength of 809 nm passes through a KTP crystal only once so that no power of this light is increased. Accordingly, no strong interaction between the lights having the wavelengths of 1064 nm and 809 nm can be obtained in the KTP crystal. Therefore, it is impossible to efficiently generate light having a sum frequency in the KTP crystal so that no light having a sum frequency can be efficiently emitted from the wavelength converting element.

A second higher harmonic wave generating element is called an SHG element in the following description. For example, this SHG element is disclosed in a literature "Journal of Optical Society of America B Vol. 3, No. 9, pp. 1175 to 1179 in 1986".

In this general SHG element, a semiconductor laser can directly emit LD light modulated at a high speed in the order of about several MHz by modulating a driving electric current of the semiconductor laser in the order of about several MHz at a high speed. However, a modulating frequency (or a modulating speed) of a Nd:YAG laser medium composed of a solid laser medium is limited and is of the order of about several KHz by its fluorescence lifetime of several hundred $\mu$ seconds. Accordingly, no solid laser such as Nd:YAG is modulated at a high speed in the order of several MHz even when the LD light modulated at a high speed in the order of several MHz is incident to the Nd:YAG laser medium from the semiconductor laser. SHG light finally emitted from a Nd:YAG laser resonator is not changed to a light beam modulated at a high speed in the order of about several MHz, but is changed to a light beam modulated in the order of about several KHz.

Therefore, in the general SHG element, the diameter of a converged light spot can be reduced, but no SHG light modulated at a high speed can be emitted from the SHG element. Accordingly, when the SHG element is applied to an optical pickup, etc., no information can be written, erased and read at high speeds.

SUMMARY OF THE INVENTION

It is therefore a first object of the present invention to provide a wavelength converting element for efficiently emitting light having a sum frequency.

A second object of the present invention is to provide a system for recording and reproducing optical information at a high speed by a converged light spot having a sufficiently small diameter in an optical pickup, etc.

The above first object of the present invention can be achieved by a wavelength converting element in which an oscillation line at a predetermined wavelength is excited on the basis of excited light having a predetermined wavelength, and frequencies of the excited light and light on the oscillation line are mixed with each other in a nonlinear optical medium to generate light having a sum frequency, the wavelength converting element comprising a resonator for the oscillation line; and a resonator for the excited light.

The nonlinear optical medium may be arranged within the resonators for the oscillation line and the excited light.

The resonator for the oscillation line or the excited light may be formed by setting a predetermined material face constituting the wavelength converting element to have a predetermined reflectivity with respect to the oscillation line or the excited light.

A face of the nonlinear optical medium on a side opposite to an original face for emitting the light having a sum frequency may have a reflectivity sufficient to reflect the generated light having the sum frequency.

In accordance with this structure, light having a sum frequency can be efficiently emitted from the wavelength converting element.

The above second object of the present invention can be achieved by a system for recording and reproducing optical information, comprising a first light source capable of being directly modulated; and a second light source for emitting short wavelength light having a wavelength shorter than that of a light beam emitted from the first light source. The optical information recording and reproducing system is constructed such that the first beam from the first light source is superposed on the short wavelength light from the second light source to record and reproduce the optical information. The optical information recording and reproducing system uses an overwrite recording system in which a writing operation of data is performed by emitting a modulated light beam from the first light source and superposing this modulated light beam on the short wavelength light, and data indicative of value "0" are equivalently written to a memory medium by erasing data therefrom in this writing operation.

An intensity of the short wavelength light emitted from the second light source may be set to a large value about an erasing intensity level at a writing time of the optical information.

In this optical information recording and reproducing system, the first light source emits a light beam modulated at a high speed. This light beam is superposed on light having a short wavelength. Accordingly, as a result of this superposition, it is possible to apparently emit the short wavelength light as light modulated at a high speed even when no short wavelength light itself is modulated at a high speed. Data indicative of value "0" or "1" can be written to a memory medium by such short wavelength light apparently modulated at a high speed. Further, in the present invention, an overwrite recording system is used to write data to the memory medium. In this overwrite recording system, data indicative of value "0" are equivalently written to the memory medium by erasing data therefrom. In this case, it is not necessary to set the modulating width of an intensity of the light beam from the first light source to be wide. Accordingly, it is possible to set the intensity of the light beam from the first light source to be relatively small so that an intensity of the short wavelength light can be correspondingly increased relatively. Therefore, it is possible to sufficiently reduce the diameter of a converged light spot.

In particular, when the intensity of the short wavelength light is set to a relatively large value about an erasing intensity level, the diameter of the converged light spot can be sufficiently reduced without any great influence of power of the light beam from the first light source, thereby increasing a capacity of the optical memory medium.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a wavelength converting element and an optical information recording and reproducing system in the present invention will next be described in detail with reference to the accompanying drawings.

Figure 1:
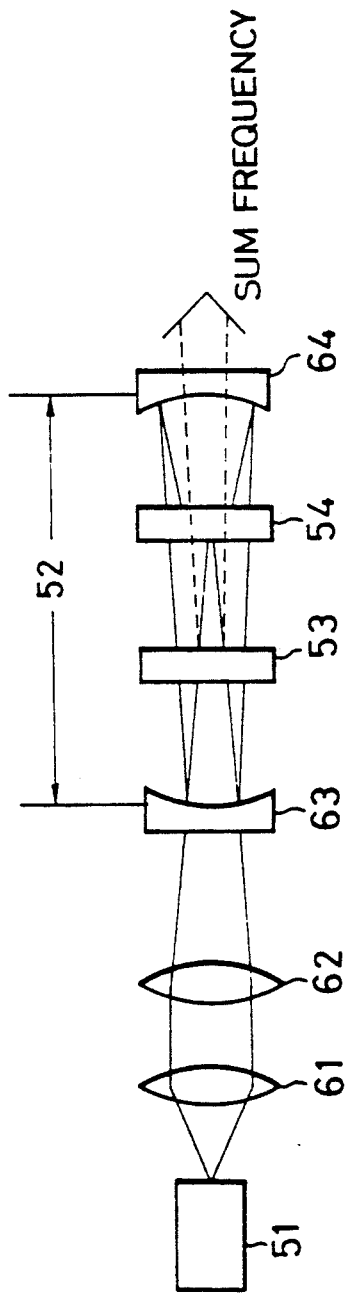
FIG. 1 is a view showing the construction of a general wavelength converting element.

FIG. 1 shows the construction of a general wavelength converting element. In this wavelength converting element, a laser beam having a wavelength of 809 nm is emitted from a semiconductor laser 51. The laser beam is shaped by a pair of cylindrical lenses 61 and 62 and is then incident to a mirror 63. The laser beam incident to the mirror 63 is further incident to a KTP crystal 53 as a nonlinear optical medium. Thereafter, the laser beam is incident to a Nd:YAG laser medium 54 as excited light. An oscillation line at a wavelength of 1064 nm is excited in the Nd: YAG laser medium 54. At this time, a constructional section between mirrors 63 and 64 in FIG. 1 functions as a laser resonator 52 with respect to light having the wavelength of 1064 nm. Power of light having the wavelength of 1064 nm and excited in the Nd:YAG laser medium 54 is amplified within a resonator 52. Frequencies of laser beams having wavelengths of 1064 nm and 809 nm are mixed with each other in the KTP crystal 53 and are converted to a sum frequency at a wavelength of 459 nm shorter than that of each of the laser beams. Light having the converted sum frequency is emitted from the mirror 64.

The above wavelength converting element has a problem that light emitting efficiency of the sum frequency is low.

For example, the above wavelength converting element is designed such that the laser resonator 52 formed between the mirrors 63 and 64 functions as a resonator with respect to light having the wavelength of 1064 nm and excited in the Nd:YAG laser medium 54. In this case, the light having the wavelength of 1064 nm is amplified by the laser resonator 52 and has large power within this laser resonator 52. However, light having the wavelength of 809 nm passes through the KTP crystal 53 only once so that no power of this light is increased. Accordingly, no strong interaction between the lights having the wavelengths of 1064 nm and 809 nm can be obtained in the KTP crystal 53. Therefore, it is impossible to efficiently generate light having a sum frequency in the KTP crystal 53 so that no light having a sum frequency can be efficiently emitted from the wavelength converting element. Accordingly, to improve light emitting efficiency of the sum frequency, it is also necessary to amplify the power of light having the wavelength of 809 nm within the wavelength converting element such that this light power is large within the KTP crystal 53.

This invention is made in accordance with the above idea. In the present invention, a resonator for an oscillation line of a laser medium (e.g., light having a wavelength of 1064 nm) is formed within a wavelength converting element. Further, a resonator for excited light having a wavelength of e.g., 809 nm is formed within the wavelength converting element. Accordingly, for example, power of each of the lights having the wavelengths of 1064 nm and 809 nm is increased. Thus, an interaction between these lights is increased within a nonlinear optical medium so that light having a sum frequency is efficiently generated and emitted from the wavelength converting element.

Figure 2:
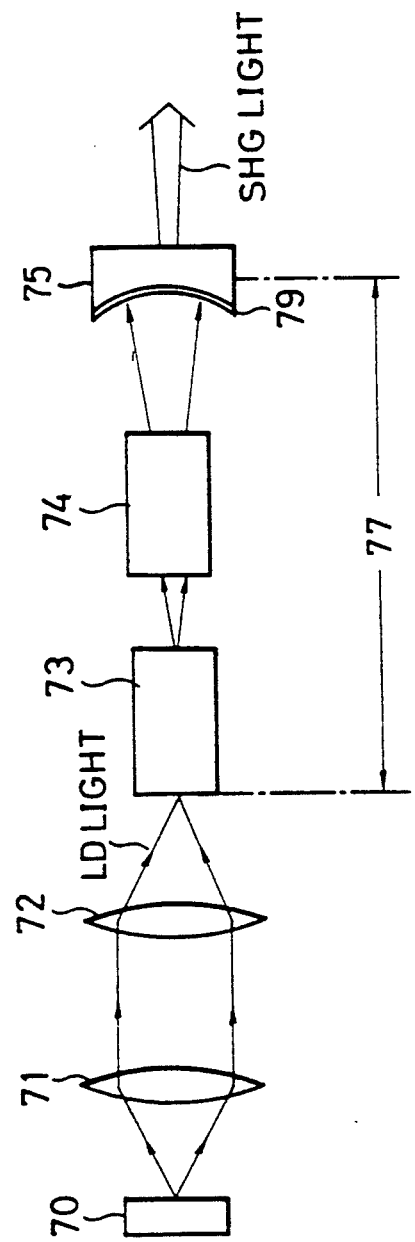
FIG. 2 is a view showing the construction of a general light source device for emitting SHG light.

FIG. 2 shows a second higher harmonic wave generating element called an SHG element in the following description. This SHG element has a semiconductor laser 70 for emitting a light beam (which is called LD light in the following description) having a wavelength about 808 nm, and has a collimator lens 71 for changing the light beam emitted from the semiconductor laser 70 to parallel light. The SHG element also has a condenser lens 72 for converging the LD light transmitted through the collimator lens 71. The SHG element further has a Nd:YAG laser medium 73, KTP 74 as a nonlinear optical crystal for the conversion of a second higher harmonic wave, and an output mirror 75. A constructional section between an end face of the Nd:YAG laser medium 73 on a side of the semiconductor laser 70 and the output mirror 75 functions as a Nd:YAG laser resonator 77. The semiconductor laser 70 functions as a light source for excitation with respect to the Nd:YAG laser resonator 77.

More particularly, a predetermined coating film 79 is formed on a concave face of the output mirror 75. For example, this coating film 79 is constructed by using a material having a high reflectivity with respect to light having a wavelength of 1064 nm on an oscillation line of a Nd:YAG laser and having a low reflectivity with respect to light having a half wavelength of 532 nm. Namely, the coating film 79 functions as a mirror with respect to light having the wavelength of 1064 nm. Thus, a Q-factor of the laser resonator 77 is high with respect to wavelength 1064 nm and is low with respect to the half wavelength 532 nm.

In the SHG element constructed above, LD light is emitted from the semiconductor laser 70 when the semiconductor laser 70 is operated. This LD light is incident to the Nd:YAG laser medium 73 through the collimator lens 71 and the condenser lens 72. The Nd:YAG laser medium 73 has an absorption wavelength about 808 nm. Accordingly, when the LD light having a wavelength about 808 nm is incident to the Nd:YAG laser medium 73, the incident LD light is absorbed into the Nd:YAG laser medium 73 and is used for pumping. Thus, light having a wavelength of 1064 nm is excited within the Nd:YAG laser resonator 77. The excited light having a wavelength of 1064 nm is converted by KTP 74 to light having a half wavelength of 532 nm and is emitted as second higher harmonic wave generating light (SHG light) from the Nd:YAG laser resonator 77.

As mentioned above, the SHG light emitted from the SHG element shown in FIG. 2 has a preferable beam quality and has a short wavelength of 532 nm. Accordingly, the SHG light can be converged by an objective lens until a limit of diffraction so that the diameter of a converged light spot can be reduced.

In the above general SHG element, the semiconductor laser 70 can directly emit LD light modulated at a high speed in the order of about several MHz by modulating a driving electric current of the semiconductor laser in the order of about several MHz at a high speed. However, a modulating frequency (or a modulating speed) of the Nd:YAG laser medium 73 composed of a solid laser medium is limited and is of the order of about several kHz by its fluorescence lifetime of several hundred μ seconds. Accordingly, no solid laser such as Nd:YAG is modulated at a high speed in the order of several MHz even when the LD light modulated at a high speed in the order of several MHz is incident to the Nd:YAG laser medium 73 from the semiconductor laser 70. The SHG light finally emitted from the Nd:YAG laser resonator 77 is not changed to a light beam modulated at a high speed in the order of about several MHz, but is changed to a light beam modulated in the order of about several KHz.

Therefore, in the general SHG element as shown in FIG. 2, the diameter of a converged light spot can be reduced, but no SHG light modulated at a high speed can be emitted from the SHG element. Accordingly, when the SHG element is applied to an optical pickup, etc., no information can be written, erased and read at high speeds.

Figure 3A:
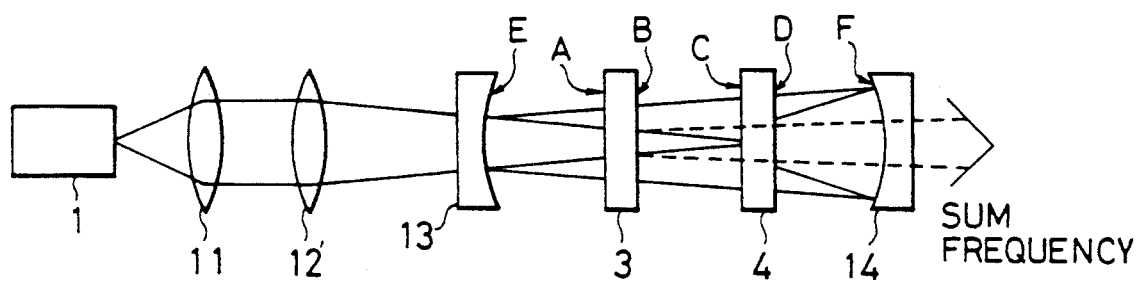
FIGS. 3a to 3c are views showing the construction of a wavelength converting element in accordance with a first embodiment of the present invention.

A wavelength converting element in accordance with a first embodiment of the present invention will next be described in detail with reference to FIGS. 3a to 3c. FIG. 3a is a constructional view of the wavelength converting element in the first embodiment of the present invention. The wavelength converting element shown in FIG. 3a has an arrangement similar to that of the general wavelength converting element shown in FIG. 1. In FIG. 3a, the wavelength converting element has a semiconductor laser 1, a pair of cylindrical lenses 11, 12, a pair of mirrors 13, 14, a KTP crystal 3 as a nonlinear optical medium, and a Nd:YAG laser medium 4. The pair of cylindrical lenses 11 and 12 shapes a laser beam having a wavelength of 809 nm and emitted from the semiconductor laser 1. In the Nd:YAG laser medium 4, light having a wavelength of 1064 nm is excited by the laser beam as excited light having the wavelength of 809 nm.

Figure 3B:
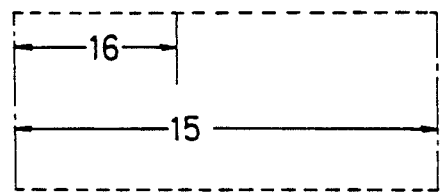

For example, this wavelength converting element is constructed as shown by one pattern P1 in FIG. 3b. Namely, in accordance with this pattern P1, a constructional section between a face E of the mirror 13 and a face F of the mirror 14 functions as a resonator 15 with respect to light having the wavelength of 1064 nm. A constructional section between the face E of the mirror 13 and a face B of the KTP crystal 3 functions as a resonator 16 with respect to light having the wavelength of 809 nm.

Figure 3C:
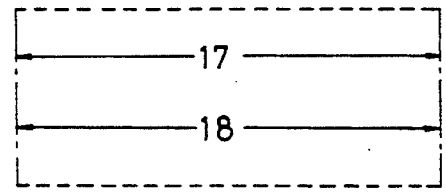

Otherwise, this wavelength converting element may be constructed as shown by another pattern P2 in FIG. 3c. In accordance with this pattern P2, the constructional section between the face E of the mirror 13 and the face F of the mirror 14 functions as a resonator 17 with respect to light having the wavelength of 1064 nm and also functions as a resonator 18 with respect to light having the wavelength of 809 nm.

Concretely, the above pattern P1 or P2 can be functionally realized in accordance with the following Table 1.

TABLE 1

| pattern | wavelength (nm) | mirror 13 E | KTP crystal A | KTP crystal B | Nd:YAG C | Nd:YAG D | mirror 14 F |
|---|---|---|---|---|---|---|---|
| P1 | 809 | R | AR | R | AR | R(HR) | — |
|  | 1064 | HR | AR | AR | AR | AR | HR |
|  | 459 | HR(R) | HR | AR | AR | AR | AR |
| P2 | 809 | R | AR | AR | AR | AR | HR |
|  | 1064 | HR | AR | AR | AR | AR | HR |
|  | 459 | HR(R) | HR | AR | AR | AR | AR |

In this Table 1, the faces E and F of the mirrors 13 and 14, faces A and B of the KTP crystal 3, and faces C and D of the Nd:YAG laser medium 4 are respectively set to have predetermined reflectivities.

In this Table 1, reference numerals "HR", "R" and "AR" respectively designate a high reflection, a partial reflection and no reflection.

In such a wavelength converting element, a laser beam having a wavelength of 809 nm and emitted from the semiconductor laser 1 is shaped by the pair of cylindrical lenses 11 and 12. For example, a converged spot of the laser beam is shaped in a circular shape. Thereafter, the shaped laser beam is incident to the mirror 13 and is further incident to the KTP crystal 3 as a nonlinear optical medium. Thereafter, the laser beam is incident to the Nd:YAG laser medium 4. An oscillation line at a wavelength of 1064 nm is excited in the Nd:YAG laser medium 4.

As shown in the Table 1, to functionally realize the above pattern P1, the faces E and F of the mirrors 13 and 14 are respectively set to have high reflectivities (HR) with respect to light having the wavelength of 1064 nm such that these mirror faces E and F construct the resonator 15 with respect to light having the wavelength of 1064 nm. Further, the face E of the mirror 13 and the face B of the KTP crystal 3 are respectively set to have predetermined reflectivities (R) with respect to light having the wavelength of 809 nm such that these faces E and B construct the resonator 16 with respect to light having the wavelength of 809 nm. In such a case, light having the wavelength of 1064 nm and excited in the Nd:YAG laser medium 4 is amplified by the resonator 15 formed between the faces E and F of the mirrors 13 and 14, thereby increasing power of this light. The laser beam having the wavelength of 809 nm and incident to the mirror 13 is also amplified by the resonator 16 formed between the face E of the mirror 13 and the face B of the KTP crystal 3, thereby increasing power of this laser beam.

As a result, the powers of the lights having the wavelengths of 1064 nm and 809 nm are increased within the KTP crystal 3 arranged within both the resonators 15 and 16 so that an interaction between these lights is increased. Accordingly, light having a sum frequency at a wavelength of 459 nm is efficiently generated so that the wavelength converting element can efficiently emit this light from the mirror 14.

Similarly, to functionally realize the pattern P2, as shown in the Table 1, the faces E and F of the mirrors 13 and 14 are set to have high reflectivities (HR) with respect to light having the wavelength of 1064 nm such that these mirror faces E and F construct the resonator 17 with respect to light having the wavelength of 1064 nm. Further, the faces E and F of the mirrors 13 and 14 are respectively set to have predetermined reflectivities (R, HR) with respect to light having the wavelength of 809 nm such that these mirror faces E and F also construct the resonator 18 with respect to light having the wavelength of 809 nm. In this case, light having the wavelength of 1064 nm and excited in the Nd:YAG laser medium 4 is amplified by the resonator 17 formed between the faces E and F of the mirrors 13 and 14 so that power of this light is increased. Further, a laser beam having the wavelength of 809 nm and incident to the mirror 13 is also amplified by the resonator 18 formed between the same mirror faces E and F so that power of this light beam is increased.

As a result, similar to the case of the pattern P1, the powers of the lights having the wavelengths of 1064 nm and 809 nm are increased within the KTP crystal 3 arranged within both the resonators 17 and 18 so that an interaction between these lights is increased. Accordingly, light having a sum frequency at a wavelength of 459 nm is efficiently generated so that the wavelength converting element can efficiently emit this light from the mirror 14.

Figure 4A:
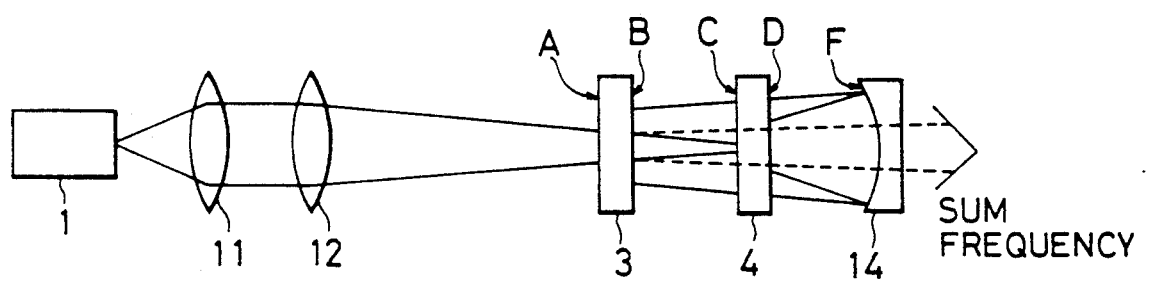
FIGS. 4a to 4c are views showing the construction of a wavelength converting element in accordance with a second embodiment of the present invention.
Figure 4B:
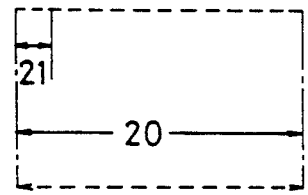

FIG. 4a is a view showing the construction of a wavelength converting element in accordance with a second embodiment of the present invention. In this second embodiment, a face A of a KTP crystal 3 also functions as the mirror 13 in the first embodiment. For example, a pattern P3 shown in FIG. 4b corresponds to the pattern P1. In accordance with this pattern P3, a constructional section between the face A of the KTP crystal 3 and a face F of a mirror 14 functions as a resonator 20 with respect to light having a wavelength of 1064 nm. Further, a constructional section between the face A of the KTP crystal 3 and a face B of this KTP crystal 3 functions as a resonator 21 with respect to light having a wavelength of 809 nm.

Figure 4C:
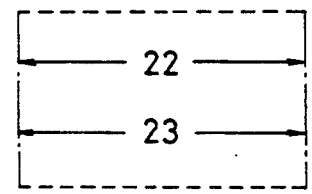

Otherwise, another pattern P4 shown in FIG. 4c and corresponding to the pattern P2 may be used. In accordance with this pattern P4, the constructional section between the face A of the KTP crystal 3 and the face F of the mirror 14 functions as a resonator 22 with respect to light having the wavelength of 1064 nm. This constructional section also functions as a resonator 23 with respect to light having the wavelength of 809 nm.

Concretely, the above pattern P3 or P4 can be functionally realized in accordance with the following Table 2.

TABLE 2

| pattern | wavelength (nm) | mirror 13 E | KTP crystal A | B | Nd:YAG C | D | mirror 14 F |
|---|---|---|---|---|---|---|---|
| P3 | 809 | | R | R | AR | R(HR) | — |
| | 1064 | | HR | AR | AR | AR | HR |
| | 459 | | HR(R) | AR | AR | AR | AR |
| P4 | 809 | | R | AR | AR | AR | HR |
| | 1064 | | HR | AR | AR | AR | HR |
| | 459 | | HR(R) | AR | AR | AR | AR |

In this Table 2, the face F of the mirror 14, the faces A and B of the KTP crystal 3, and faces C and D of the Nd:YAG laser medium 4 are respectively set to have predetermined reflectivities.

An operation of such a wavelength converting element is similar to that in the first embodiment. Namely, in accordance with the pattern P3, powers of lights having both the wavelengths 1064 nm and 809 nm are increased within the KTP crystal 3 by the resonators 20 and 21. In accordance with the pattern P4, the powers of lights having both the wavelengths 1064 nm and 809 nm are increased within the KTP crystal 3 by the resonators 22 and 23. Accordingly, an interaction between these lights is increased. Therefore, light having a sum frequency at a wavelength of 459 nm is efficiently generated so that the wavelength converting element can efficiently emit this light from the mirror 14. Further, in this second embodiment, the construction of the wavelength converting element can be simplified and the wavelength converting element can be made compact since no mirror 13 is required.

For example, a pattern different from the above patterns P1 to P4 can be used in the first and second embodiments. In accordance with this different pattern, a constructional section between the face E of the mirror 13 and the face D of the Nd:YAG laser medium 4, or a constructional section between the face A of the KTP crystal 3 and the face D of the Nd:YAG laser medium 4 is constructed as a resonator with respect to light having the wavelength of 809 nm.

Figure 5A:
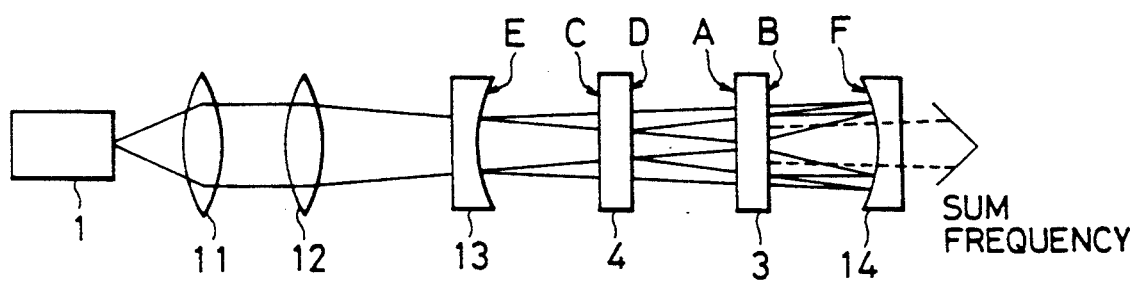
FIGS. 5a to 5c are views showing the construction of a wavelength converting element in accordance with a third embodiment of the present invention.
Figure 5B:
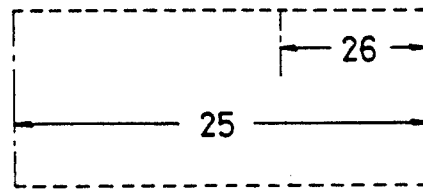

FIG. 5a is a view showing the construction of a wavelength converting element in accordance with a third embodiment of the present invention. In this third embodiment, the arrangements of a KTP crystal 3 and a Nd:YAG laser medium 4 are opposite to those in the first embodiment. In this structure, for example, in accordance with a pattern P5 shown in FIG. 5b, a constructional section between a face E of a mirror 13 and a face F of a mirror 14 functions as a resonator 25 with respect to light having the wavelength of 1064 nm. A constructional section between a face A of the KTP crystal 3 and the face F of the mirror 14 functions as a resonator 26 with respect to excited light having the wavelength of 809 nm.

Figure 5C:
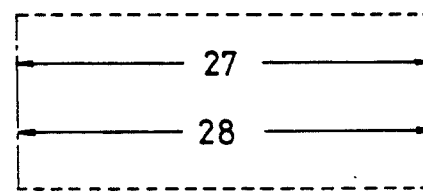

Otherwise, another pattern P6 shown in FIG. 5c may be used. In accordance with this pattern P6, a constructional section between a face E of the mirror 13 and the face F of the mirror 14 functions as a resonator 27 with respect to light having the wavelength of 1064 nm. Further, this constructional section also functions as a resonator 28 with respect to light having the wavelength of 809 nm.

Concretely, the above pattern P5 or P6 can be functionally realized in accordance with the following Table 3.

TABLE 3

| pattern | wavelength (nm) | mirror 13 E | Nd:YAG C | Nd:YAG D | KTP crystal A | KTP crystal B | mirror 14 F |
|---|---|---|---|---|---|---|---|
| P5 | 809 | AR | AR | AR | R(HR) | AR | HR |
|  | 1064 | HR | AR | AR | AR | AR | HR |
|  | 459 | — | — | — | R(HR) | AR | AR |
| P6 | 809 | R(HR) | AR | AR | AR | AR | HR |
|  | 1064 | HR | AR | AR | AR | AR | HR |
|  | 459 | — | — | — | R(HR) | AR | AR |

In this Table 3, the faces E and F of the mirrors 13 and 14, faces C and D of the Nd:YAG laser medium 4 and faces A and B of the KTP crystal 3 are respectively set to have predetermined reflectivities.

In such a wavelength converting element, a laser beam having a wavelength of 809 nm is incident to the mirror 13 and is then incident to the Nd:YAG laser medium 4. An oscillation line at a wavelength of 1064 nm is excited in the Nd:YAG laser medium 4 and the laser beam is incident to the KTP crystal 3 as a nonlinear optical medium. In the case of the pattern P5, lights having the wavelengths of 1064 nm and 809 nm are amplified by the resonators 25 and 26 so that power of each of these lights is increased. In the case of the pattern P6, lights having the wavelengths of 1064 nm and 809 nm are amplified by the resonators 27 and 28 so that power of each of these lights is increased. As a result, both the powers of these lights are increased within the KTP crystal 3 arranged in the resonators 25 and 26 so that an interaction between these lights is increased. Therefore, it is possible to efficiently generate light having a sum frequency at a wavelength of 459 nm and efficiently emit this light from the mirror 14.

Figure 6A:
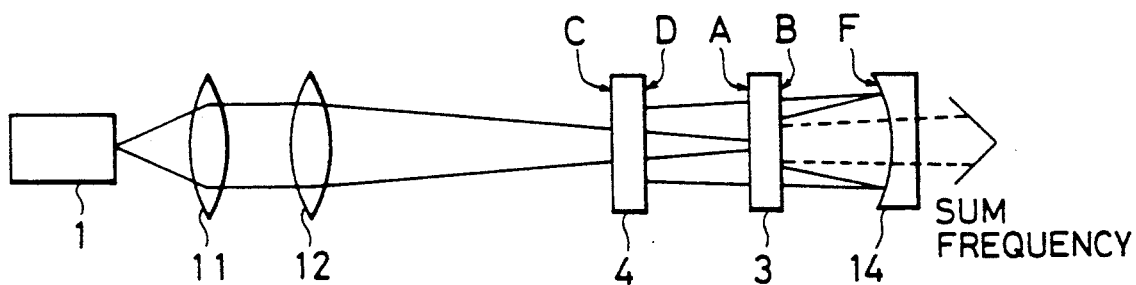
FIGS. 6a to 6d are views showing the construction of a wavelength converting element in accordance with a fourth embodiment of the present invention.
Figure 6B:
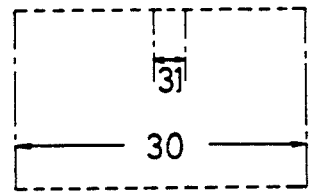

FIG. 6a is a view showing the construction of a wavelength converting element in accordance with a fourth embodiment of the present invention. In this fourth embodiment, a face C of a Nd:YAG laser medium 4 also functions as the mirror 13 in the third embodiment. In this structure, for example, in accordance with a pattern P7 shown in FIG. 6b, a constructional section between a face A of a KTP crystal 3 and a face B of this KTP crystal 3 can function as a resonator 31 with respect to light having the wavelength of 809 nm. A constructional section between a face C of the Nd:YAG laser medium 4 and a face F of a mirror 14 can function as a resonator 30 with respect to light having the wavelength of 1064 nm.

Figure 6C:
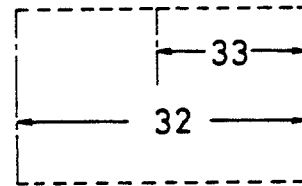

Otherwise, a pattern P8 corresponding to the pattern P5 can be used as shown in FIG. 6c. In accordance with this pattern P8, the constructional section between the face C of the Nd:YAG laser medium 4 and the face F of the mirror 14 can function as a resonator 32 with respect to light having the wavelength of 1064 nm. A constructional section between the face A of the KTP crystal 3 and the face F of the mirror 14 can function as a resonator 33 with respect to light having the wavelength of 809 nm.

Figure 6D:
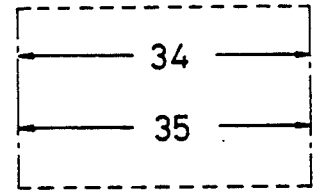

Otherwise, a pattern P9 corresponding to the pattern P6 can be used as shown in FIG. 6d. In accordance with this pattern P9, the constructional section between the face C of the Nd:YAG laser medium 4 and the face F of the mirror 14 can function as a resonator 34 with respect to light having the wavelength of 1064 nm. This constructional section can also function as a resonator 35 with respect to light having the wavelength of 809 nm.

Concretely, the above pattern P7, P8 or P9 can be functionally realized in accordance with the following Table 4.

TABLE 4

| pattern | wavelength (nm) | mirror 13 E | Nd:YAG C | Nd:YAG D | KTP crystal A | KTP crystal B | mirror 14 F |
|---|---|---|---|---|---|---|---|
| P7 | 809 |  | AR | AR | R(HR) | HR | — |
|  | 1064 |  | HR | AR | AR | AR | HR |
|  | 459 |  | — | — | R(HR) | AR | AR |
| P8 | 809 |  | AR | AR | R(HR) | AR | HR |
|  | 1064 |  | HR | AR | AR | AR | HR |
|  | 459 |  | — | — | R(HR) | AR | AR |
| P9 | 809 |  | R(HR) | AR | AR | AR | HR |
|  | 1064 |  | HR | AR | AR | AR | HR |
|  | 459 |  | — | — | R(HR) | AR | AR |

In this Table 4, the face F of the mirror 14, faces C and D of the Nd:YAG laser medium 4 and the faces A and B of the KTP crystal 3 are respectively set to have predetermined reflectivities.

An operation of such a wavelength converting element is similar to that in the third embodiment. Namely, in accordance with the pattern P7, powers of lights having both the wavelengths 1064 nm and 809 nm are increased within the KTP crystal 3 by the resonators 30 and 31. In accordance with the pattern P8, the powers of lights having both the wavelengths 1064 nm and 809 nm are increased within the KTP crystal 3 by the resonators 32 and 33. In accordance with the pattern P9, the powers of lights having both the wavelengths 1064 nm and 809 nm are increased within the KTP crystal 3 by the resonators 34 and 35. Accordingly, an interaction between these lights is increased. Therefore, light having a sum frequency at a wavelength of 459 nm is efficiently generated so that the wavelength converting element can efficiently emit this light from the mirror 14. Further, in this fourth embodiment, the construction of the wavelength converting element can be simplified and the wavelength converting element can be made compact since no mirror 13 is required.

As mentioned above, in the above respective embodiments, resonators are respectively formed with respect to lights having the wavelengths of 1064 nm and 809 nm so that powers of both the lights are increased within the resonators. Accordingly, an interaction between these lights is increased within a nonlinear optical medium arranged within the resonators. Thus, it is possible to efficiently generate light having a sum frequency at a wavelength of 459 nm and efficiently emit this light having the sum frequency from the mirror 14.

In this case, the light having the sum frequency is also generated within the KTP crystal 3 in a direction opposite to a light emitting direction of the mirror 14. Accordingly, as shown in the Tables 1 to 4, the face A of the KTP crystal 3 is set to have a high reflectivity (HR) with respect to light having the wavelength of 459 nm. Thus, it is possible to reduce loss of the sum frequency and efficiently obtain the light having the sum frequency in only the original light emitting direction. Further, as shown in the Tables 1 to 4, a face unrequired to reflect light having a predetermined wavelength thereon is preferably coated with a coating material for unreflecting the light having this wavelength as shown by reference numeral AR. For example, in the above first embodiment, each of the faces A and C is coated with a coating material for unreflecting light having the wavelength of 809 nm so that it is possible to reduce loss of this light having the wavelength of 809 nm.

Further, in the respective embodiments mentioned above, Nd:YAG is used as a laser medium, but Nd:YVO$_4$ may be used as a laser medium.

As mentioned above, in the present invention, a resonator for an oscillation line excited by excited light and a resonator for the excited light are formed within a wavelength converting element. Accordingly, light power on the oscillation line and power of the excited light are increased so that an interaction between both the lights is increased in a nonlinear optical medium. Thus, it is possible to efficiently generate light having a sum frequency in the nonlinear optical medium and efficiently emit this light from the wavelength converting element.

In this case, powers of both the lights can be increased within the nonlinear optical medium by arranging this nonlinear optical medium within each of the resonators for the oscillation line and the excited light. Thus, it is possible to more efficiently generate light having the sum frequency and more efficiently emit this light from the wavelength converting element.

Each of the above resonators is formed by setting a predetermined material face constituting the wavelength converting element to have a predetermined reflectivity. Accordingly, for example, the above two resonators can be simply formed in a state in which a constructional arrangement of the general wavelength converting element is maintained as it is. Otherwise, the above two resonators can be simply formed by using a small number of parts in comparison with those in the constructional arrangement of the general wavelength converting element.

A face of the above nonlinear optical medium located on a side opposite to an original face for emitting light having the sum frequency has a reflectivity sufficient to reflect the generated light having the sum frequency. Accordingly, the light having the sum frequency and generated in the nonlinear optical medium can be emitted from only the original light emitting face so that light emitting efficiency of the sum frequency can be further increased.

Figure 7:
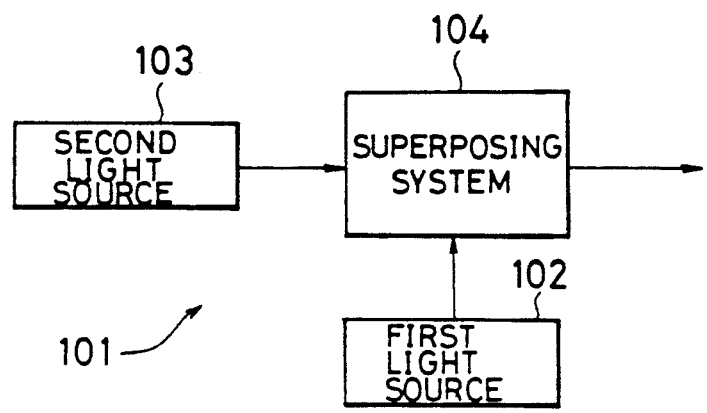
FIG. 7 is a block diagram showing the construction of a light source device used in a system for recording and reproducing optical information in the present invention.

A system for recording and reproducing optical information in the present invention will next be described in detail with reference to FIGS. 7 to 14. FIG. 7 is a block diagram showing the construction of a light source device 101 used in the optical information recording and reproducing system in the present invention. The light source device 101 shown in FIG. 7 has a first light source 102, a second light source 103 and a superposing system 104. The second light source 103 emits a light beam having a wavelength shorter than that of a light beam emitted from the first light source 102. The superposing system 104 superposes the light beam emitted from the second light source 103 on the light beam emitted from the first light source 102.

Figure 8:
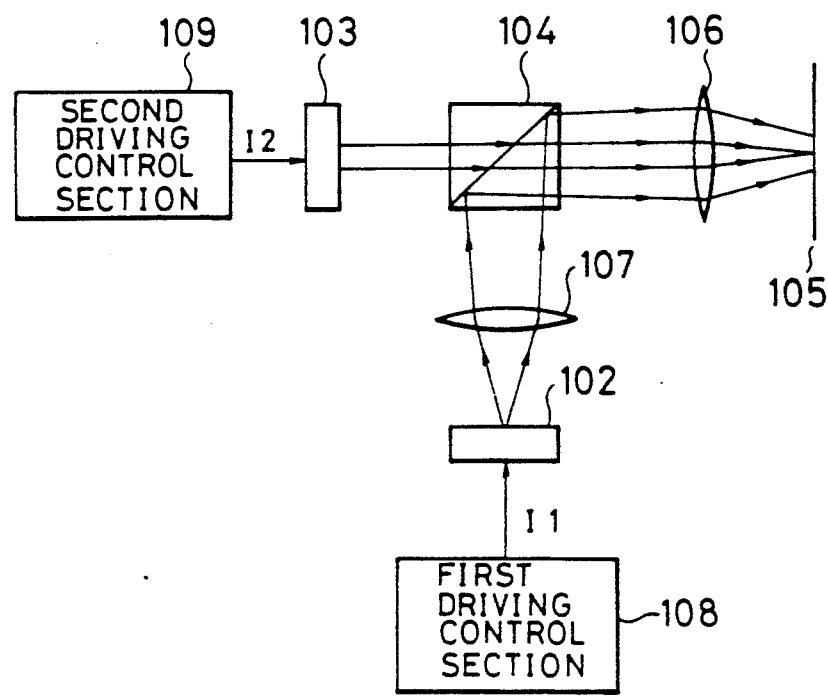
FIG. 8 is a view showing a concrete example of the light source device shown in FIG. 7.

FIG. 8 is a view showing one example of the light source device 101 shown in FIG. 7. In this example shown in FIG. 8, for example, the first light source 102 is constructed by a semiconductor laser for emitting LD light having a wavelength about 808 nm. For example, the second light source 103 is constructed by a wavelength converting element for emitting short wavelength light having a wavelength shorter than a wavelength about 808 nm. This wavelength converting element is composed of a second higher harmonic wave generating element (an SHG element) as shown in FIG. 2, a sum frequency mixing element, etc. The superposing system 104 is constructed by a beam splitter.

A lens 106 is arranged between the superposing system 104 as the beam splitter and the light receiving face 105 such that the short wavelength light emitted from the second light source 103 as the wavelength converting element is focused and formed as a focal point on the light receiving face 105 through this lens 106. A concave or convex lens 107 is disposed on a side of the semiconductor laser 102 such that the LD light from the first light source 102 as the semiconductor laser is focused and formed as a focal point in a position slightly separated from the light receiving face 105. The lens 107 is constructed by a convex lens in FIG. 8. This LD light from the first light source 102 may be located near or distant from the light receiving face 105. Thus, the diameter of a spot of the short wavelength light is set to be smaller than that of the LD light on the light receiving face 105.

The light source device shown in FIG. 8 has a first driving control section 108 for controlling an operation of the semiconductor laser 102, and a second driving control section 109 for controlling an operation of the wavelength converting element 103. The second driving control section 109 operates the wavelength converting element 103 under a constant electric current and controls the operation this wavelength converting element 103 such that light having a short wavelength and a constant intensity is emitted from the wavelength converting element 103 at any time. The first driving control circuit 108 can operate the semiconductor laser 102 under a modulated electric current and can control the operation of this semiconductor laser 102. When the operation of the semiconductor laser 102 is controlled under this modulated electric current, modulated LD light is emitted from the semiconductor laser 102. In other words, the operations of the wavelength converting element 103 and the semiconductor laser 102 are controlled such that no light having a short wavelength is modulated and only the LD light is modulated. Thus, the LD light functions as a bias component with respect to the short wavelength light in light superposed by the beam splitter 104.

In such a light source device, the operation of the semiconductor laser 102 as the first light source is controlled by the first driving control section 108. Thus, for example, the semiconductor laser 102 emits LD light having a wavelength about 808 nm and power according to a driving electric current I1. This LD light is incident to the beam splitter 104 through the lens 107. The operation of the wavelength converting element 103 as the second light source is controlled by the second driving control section 109. Thus, the wavelength converting element 103 emits short wavelength light having a wavelength shorter than a wavelength about 808 nm and power according to a driving electric current I2. This short wavelength light is also incident to the beam splitter 104. Thus, a light beam emitted from the beam splitter 104 to the light receiving face 105 is constructed by superposed light provided by superposing the short wavelength light on the LD light. This superposed light is converged by the lens 106 and is incident to the light receiving face 105.

Figure 9:
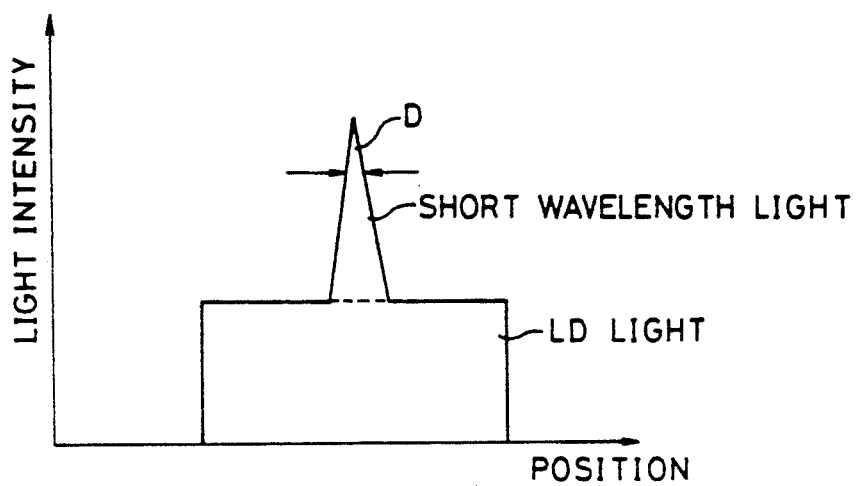
FIG. 9 is a view showing one example of an intensity distribution of superposed light.

FIG. 9 is a view showing one example of an intensity distribution of the superposed light converged on the light receiving face 105. The short wavelength light emitted from the wavelength converting element 103 has a short wavelength and is converged by the lens 106 such that this light is focused and formed as a focal point on the light receiving face 105. In contrast to this, the LD light emitted from the semiconductor laser 102 has a wavelength longer than that of the short wavelength light from the wavelength converting element 103. This LD light is focused and formed as a focal point by the lens 107 in a position slightly separated from the light receiving face 105. Accordingly, as can be seen from FIG. 9, with respect to the superposed light, the short wavelength light has a small spot diameter D on the light receiving face 105 in comparison with the LD light. In other words, with respect to a light beam having an intensity equal to or greater than a predetermined light intensity, the diameter of a converged light spot is not increased and is maintained to be smaller that provided by using only the short wavelength light.

When the wavelength converting element 103 is operated under a constant driving electric current I2 by the second driving control section 109, power or intensity of the short wavelength light emitted from the wavelength converting element 103 is constant at any time irrespective of the passage of time. Accordingly, the amount of an intensity component of the short wavelength light in the superposed light is constantly held irrespective of the passage of time. In contrast to this, when the semiconductor laser 102 is operated under a modulated driving electric current I1 by the first driving control section 110, power or intensity of the LD light emitted from the semiconductor laser 102 is modulated in accordance with the driving electric current I1. Accordingly, the amount of an intensity component of the LD light in the superposed light is modulated in accordance with the passage of time.

Figure 10:
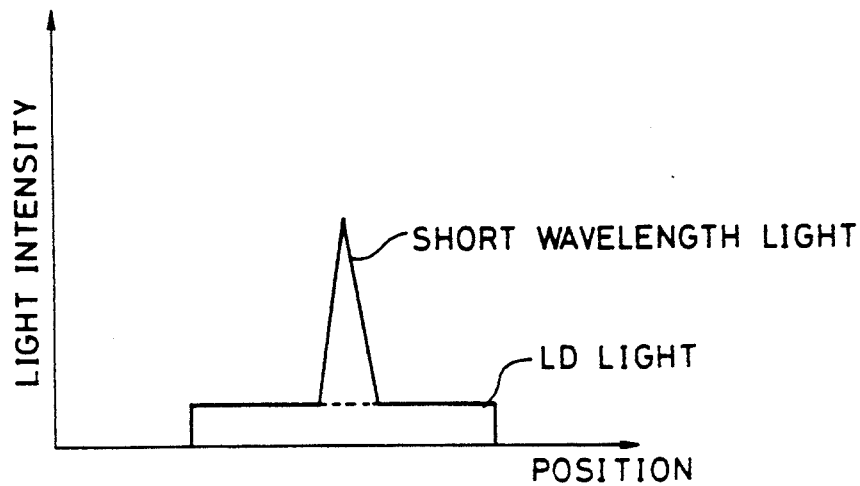
FIG. 10 is a view showing another example of the intensity distribution of superposed light.

Each of FIGS. 9 and 10 is a view showing the concept of an intensity distribution of the superposed light. For example, when the driving electric current I1 is increased at a certain time point, an intensity distribution of the superposed light on the light receiving face 105 is provided as shown in FIG. 9. In this case, when the driving electric current I1 is reduced at the next time point, the amount of an intensity component of the LD light is reduced so that the intensity distribution of the superposed light on the light receiving face 105 is changed as shown in FIG. 10. Accordingly, as can be seen from FIGS. 9 and 10, it should be understood that the LD light in the superposed light functions as bias light with respect to the short wavelength light.

The semiconductor laser 102 can be modulated in the order of several MHz at a high speed. Accordingly, the intensity component of the LD light, i.e., a bias component of the superposed light can be modulated in the order of several MHz at a high speed. In this case, it is possible to apparently obtain effects similar to those provided by modulating the short wavelength light in the order of several MHz at a high speed.

When the SHG element shown in FIG. 2 is used as the wavelength converting element 103 in this light source device 101, no SHG light having a wavelength about 532 nm and emitted from the SHG element can be modulated in the order of several MHz at a high speed as mentioned above. However, the SHG light can be apparently modulated in the order of several MHz at a high speed by superposing LD light as bias light on this SHG light. When the lens 107 is stopped down with respect to the superposed light so as to set the SHG light to have a beam diameter in a limit of diffraction, a beam diameter of the LD light is increased in comparison with that of the SHG light. However, in this case, a portion of the superposed light having an intensity equal to or greater than a predetermined light intensity is provided by the SHG light. Accordingly, the diameter of a converged light spot is not increased and can be maintained to be smaller than that provided by using only the SHG light.

Figure 11:
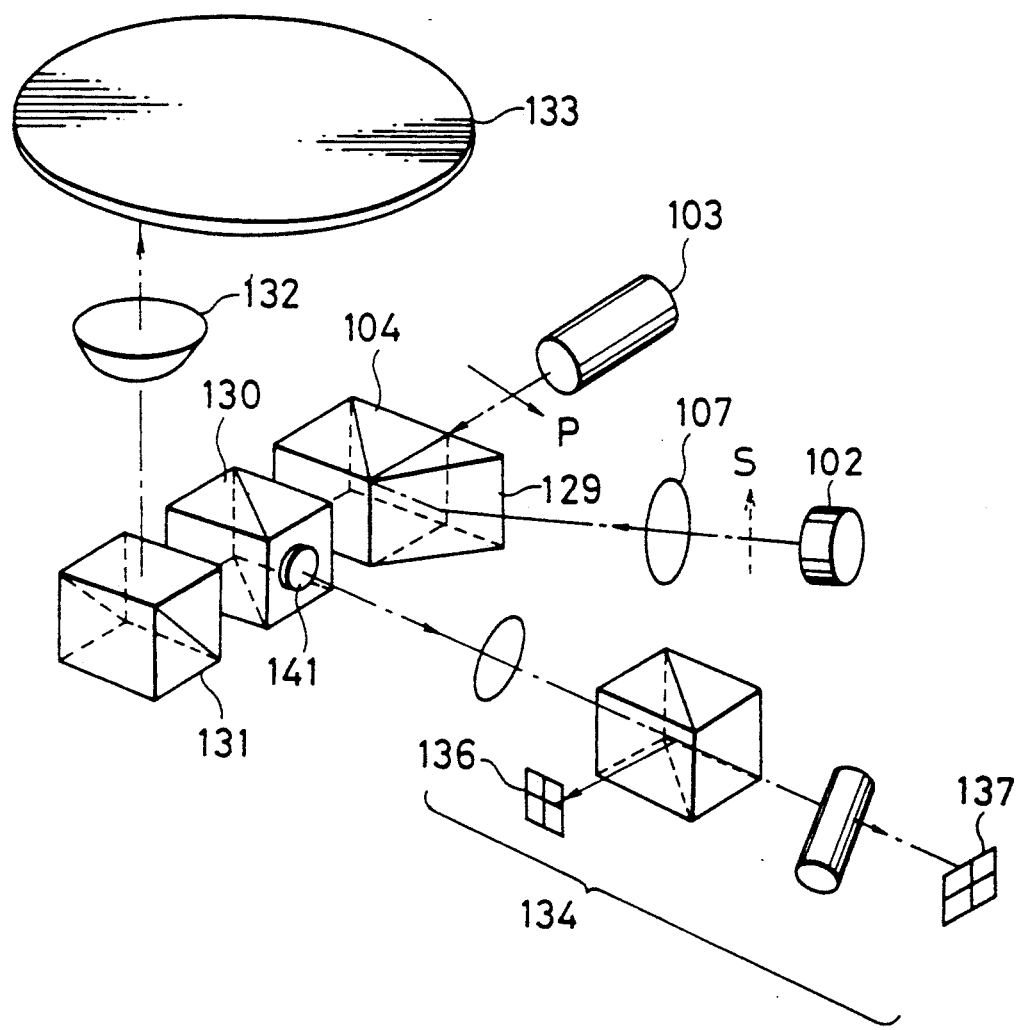
FIG. 11 is a view showing one example of the construction of an optical pickup to which the present invention is applied.

FIG. 11 is a view showing an example of the light source device 101 shown in FIG. 7 and applied to an optical pickup. In the optical pickup shown in FIG. 11, a semiconductor laser is used as a first light source 102 and an SHG element is used as a second light source 103. In this optical pickup, P-polarized SHG light is emitted from the SHG element 103 and is incident to a beam splitter 104. S-polarized LD light is emitted from the semiconductor laser 102 and is incident to the beam splitter 104 through a lens 107 and a prism 129 for shaping a light beam.

The SHG light and the LD light constitute two linearly polarized lights perpendicular to each other and are superposed by the beam splitter 104 without any light loss. This superposed light is incident to an objective lens 132 corresponding to the lens 106 shown in FIG. 8 through a beam splitter 130 and a prism 131. This objective lens 132 converges the superposed light to an optical memory medium 133 such as an optical disk corresponding to the light receiving face 105 shown in FIG. 8. Light reflected on the optical memory medium 133 is incident to a signal detecting section 134 through the prism 131 and the beam splitter 130 to detect predetermined signals by a tracking detector 136, a focusing detector 137, etc.

The P-polarized SHG light is emitted as parallel light from the SHG element. The objective lens 132 is approximately stopped down until a limit of diffraction with respect to this SHG light. Thus, the SHG light is focused and formed as a focal point on the optical memory medium 133 so that the SHG light is incident to the optical memory medium 133 as a small converged light spot. A numerical aperture of an optical system is slightly adjusted by the lens 107 such that no S-polarized LD light from the semiconductor laser 102 is focused and formed as a focal point on the optical memory medium 133.

In such an optical pickup, it is possible to utilize a writing intensity level WL, an erasing intensity level EL and a reading intensity level RL respectively in writing, erasing and reading operations of information with respect to the optical memory medium 133.

Figure 12A:
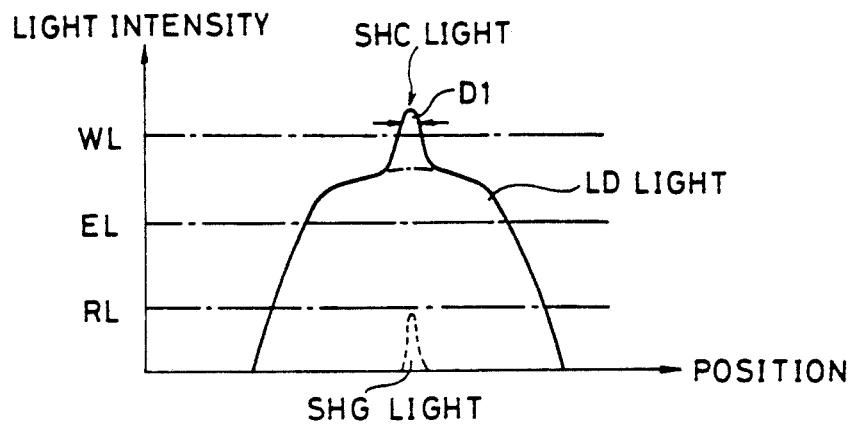
FIGS. 12a to 12c are graphs for respectively explaining the writing, erasing and reading operations of an optical memory medium when no overwrite recording system is used in the optical pickup shown in FIG. 11.

Namely, as shown in FIG. 12a, at a writing time of information, SHG light having a constant intensity is emitted from the SHG element. For example, the semiconductor laser 102 emits LD light as bias light set such that a maximum intensity of the LD light is greater than the erasing intensity level EL and a minimum intensity of this LD light is modulated and equal to zero. In this case, when the LD light is modulated in intensity and has the maximum intensity, a peak value of the intensity of superposed light exceeds the writing intensity level WL as shown by a solid line in FIG. 12a. This superposed light is converged to the optical memory medium 133 by the objective lens 132 so that data indicative of value "1" can be written to the optical memory medium 133.

In contrast to this, when the LD light is modulated in intensity and has the minimum intensity "0", a peak value of the intensity of superposed light, i.e., the SHG light is equal to or smaller than the reading intensity level RL as shown by a broken line in FIG. 12a. Accordingly, this peak value is sufficiently smaller than the writing intensity level WL so that data indicative of value "0" can be written to the optical memory medium 133. At this time, the semiconductor laser 102 can be modulated in the order of several MHz at a high speed so that the LD light as bias light can be modulated in the order of several MHz. Accordingly, it is possible to apparently modulate the SHG light at a high speed by superposing the LD light on the SHG light although no SHG light itself can be modulated at a high speed. Thus, it is possible to perform the writing operation of the optical pickup at a high speed.

Figure 12B:
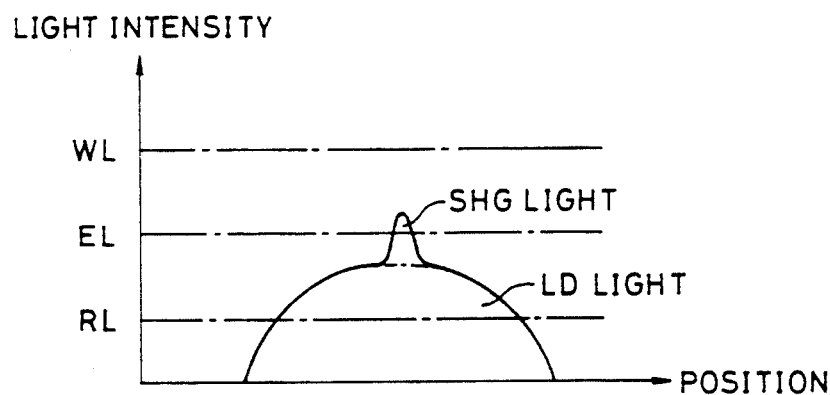

At an erasing time of information, as shown in FIG. 12b, SHG light having a constant intensity is emitted from the SHG element. Further, the semiconductor laser 102 emits LD light having an intensity smaller than that provided when data indicative of value "1" is written to the optical memory medium 133. At this time, a peak value of the intensity of superposed light is equal to or smaller than the writing intensity level WL, but exceeds the erasing intensity level EL. Accordingly, data stored to the optical memory medium 133 can be erased therefrom by converging this superposed light to the optical memory medium 133 by the objective lens 132.

Figure 12C:
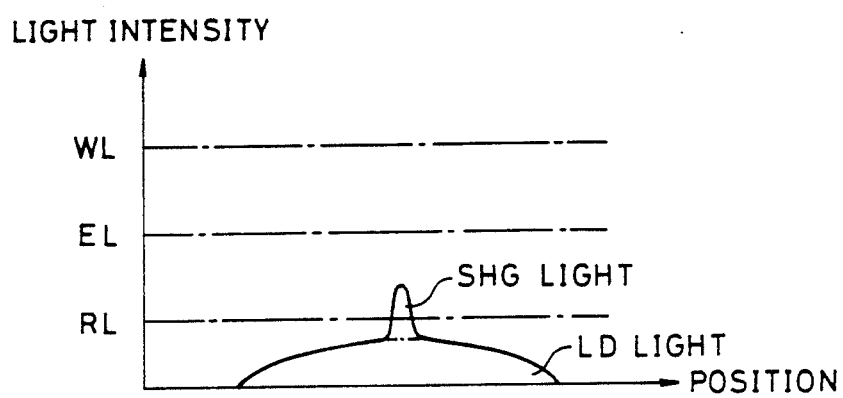

At a reading time of information, as shown in FIG. 12c, SHG light having a constant intensity is emitted from the SHG element and the intensity of LD light from the semiconductor laser 102 is further reduced. At this time, a peak value of the intensity of superposed light is smaller than the writing intensity level WL and the erasing intensity level EL, but exceeds the reading intensity level RL. Accordingly, data stored to the optical memory medium 133 can be read therefrom by converging this SHG light to the optical memory medium 133 by the objective lens 132.

No system for recording and reproducing optical information and shown in FIGS. 12a to 12c is constructed by an overwrite recording system with respect to the writing operation. The writing operation for writing data indicative of value "1" or "0" is controlled by setting a peak value of the intensity of superposed light to be greater than the writing intensity level WL, or smaller than the reading intensity level RL. Namely, to reliably write the data indicative of value "0", it is necessary to modulate and control the superposed light intensity such that the peak value of the intensity of the superposed light is equal to or smaller than the reading intensity level RL. Therefore, when the intensity of the LD light is set to zero, it is necessary to set the peak value of the intensity of the superposed light, i.e., only the SHG light to be equal to or smaller than the reading intensity level RL.

No SHG light itself can be modulated at a high speed as mentioned above. Accordingly, when data indicative of value "1" are written to the optical memory medium 133, the intensity of the SHG light itself is held at a small intensity equal to or smaller than the reading intensity level RL. Instead of this, for example, the intensity of the LD light is greatly modulated such that this LD light intensity is equal to or greater than the erasing intensity level EL. Accordingly, a ratio R (W1/W0) of powers $P_{W1}$ and $P_{W0}$ for respectively writing data indicative of values "1" and "0" is generally equal to or greater than "3". Therefore, power of the LD light with respect to power of the superposed light is greatly increased in comparison with power of the SHG light when the data indicative of value "1" are written to the optical memory medium 133.

As a result, when no overwrite recording system is used and the diameter D1 of a converged light spot is sufficiently reduced by the SHG light, the diameter D1 of the converged light spot is increased in comparison with that provided by using only the SHG light by an influence of the LD light having large power when the data indicative of value "1" are written to the optical memory medium 133. Therefore, no diameter of the converged light spot can be sufficiently reduced so that no advantages of the SHG light can be obtained.

When no overwrite recording system is used, the writing intensity level WL and the erasing intensity level EL are actually set to the same intensity level. However, in FIGS. 12a to 12c, for brevity, the erasing intensity level EL is set to be lower than the writing intensity level WL.

In contrast to this, when a phase changing system as one overwrite recording system is used, data indicative of value "0" are equivalently written to the optical memory medium 133 in an erasing mode for erasing data therefrom. The inventors in this patent application apply this phase changing system to the bias light modulation of the LD light with respect to the above SHG light. When the phase changing system is used in combination with the bias light modulation, it is not necessary to provide a wide modulating width for each of light intensities for writing data indicative of values "1" and "0" to the optical memory medium 133. Each of these light intensities is equal to a light intensity for erasing these data from the optical memory medium 133. Accordingly, the data indicative of value "0" can be reliably written to the optical memory medium even when the intensity of only the SHG light is considerably large.

Accordingly, the intensity of only the SHG light can be set to be larger than that provided when no overwrite recording system is used. Further, a maximum intensity of the LD light can be set to be small. Accordingly, it is possible to sufficiently reduce the diameter of a converged light spot without any great influence of the LD light.

Figure 13A:
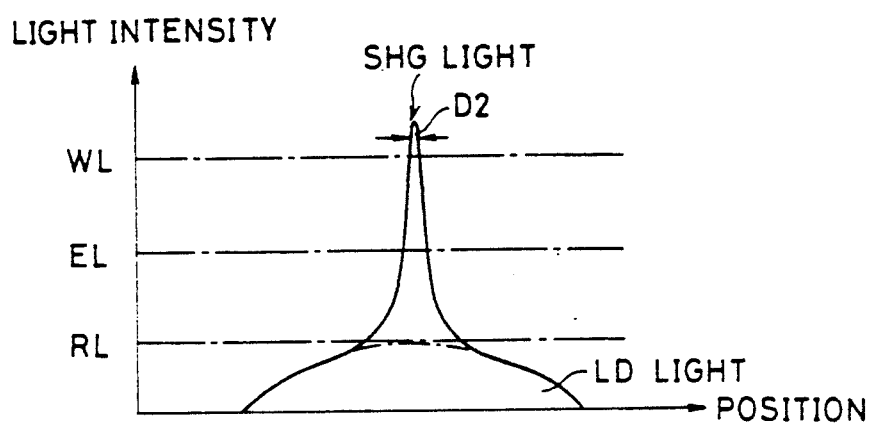
FIGS. 13a and 13b are graphs for explaining a writing principle of information when the overwrite recording system is used in the optical pickup shown in FIG. 11.
Figure 13B:
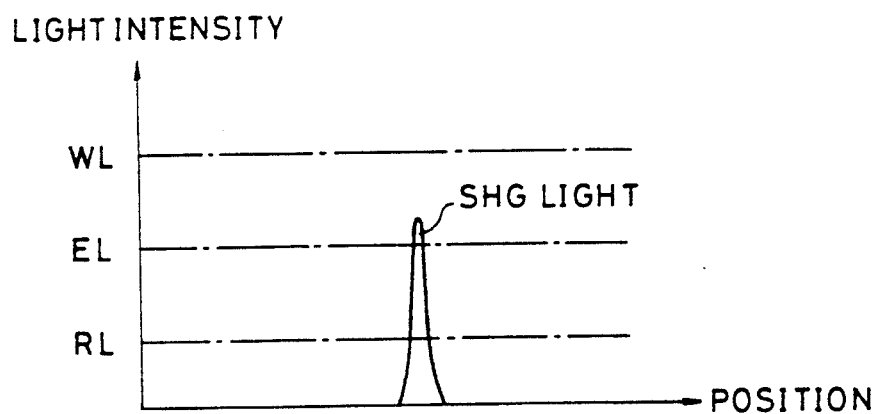

FIGS. 13a and 13b are graphs for explaining the writing principle of data based on the optical information recording and reproducing system in the present invention. In the present invention, the modulation of bias light is used in combination with the phase changing system as one overwrite recording system. As shown in FIG. 13a, when data indicative of value "1" are written to the optical memory medium, LD light is modulated such that a peak value of the intensity of superposed light is equal to or greater than a writing intensity level WL. As shown in FIG. 13b, when data indicative of value "0" are written to the optical memory medium, the LD light is modulated such that a peak value of the intensity of superposed light is equal to or greater than an erasing intensity level EL.

Concretely, the intensity of SHG light itself is set to a large value about the erasing intensity level EL. When the data indicative of value "1" are written to the optical memory medium, the intensity of the LD light can be modulated and set to about (WL−EL). When the data indicative of value "0" are written to the optical memory medium, the intensity of the LD light can be modulated and set to zero.

As mentioned above, when the overwrite recording system is used, it is not necessary to sufficiently reduce the intensity of the superposed light at the writing time of the data indicative of value "0". It is possible to relatively reduce a maximum intensity of the LD light and a modulating width of the LD light. Further, the intensity of the SHG light can be set to a large value about the erasing intensity level EL. Accordingly, a ratio R (W1/W0) of powers $P_{W1}$ and $P_{W0}$ for respectively writing data indicative of values "1" and "0" can be reduced and set to a value equal to or smaller than "2". Therefore, power of the LD light with respect to the superposed light can be relatively reduced when the data indicative of value "1" are written to the optical memory medium 133.

As a result, as can be seen from the comparison of FIGS. 13a and 12a, at the writing time of the data indicative of value "1", the diameter D2 of a converged light spot can be reduced and set to be sufficiently smaller than the diameter D1 of a converged light spot provided when no overwrite recording system is used. Accordingly, it is possible to effectively prevent the advantages obtained by the SHG light from being reduced by the LD light.

Figure 14:
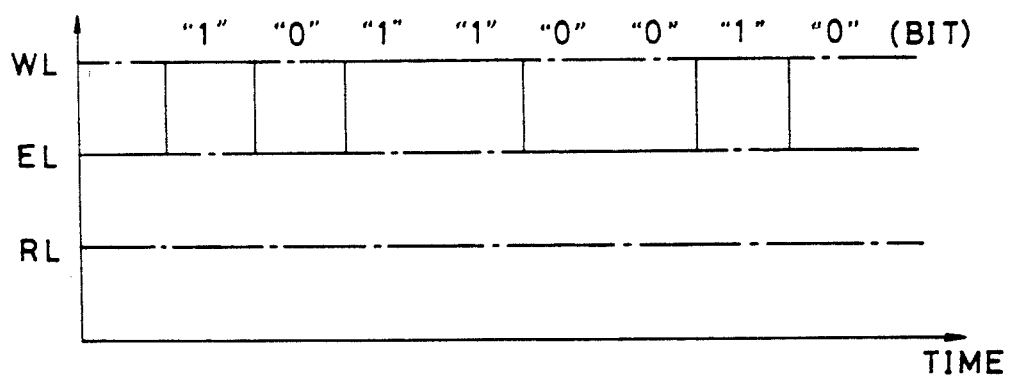
FIG. 14 is a view showing one example of the writing operation of information in the present invention.

FIG. 14 is a view for explaining a writing operation of data when the overwrite recording system is applied to the bias light modulation using the LD light. In FIG. 14, the intensity of superposed light is modulated in accordance with the widths of a writing intensity level WL and an erasing intensity level EL to write data indicative of value "1" or "0" to the optical memory medium. Namely, when the intensity of the superposed light is set to the writing intensity level WL, the data indicative of value "1" are written to the optical memory medium 133. In contrast to this, when the intensity of the superposed light is set to the erasing intensity level EL, the data indicative of value "0" are written to the optical memory medium 133.

In this case, if the intensity of the LD light is set to be relatively small and the intensity of the SHG light is set to be large as shown in FIGS. 13a and 13b, the diameter D2 of a converged light spot can be set to be sufficiently small when the data indicative of value "1" are written to the optical memory medium 133. Further, the SHG light can be apparently modulated in the order of several MHz at a high speed by modulating the LD light at a high speed. Further, data can be written to the optical memory medium 133 at a higher speed since no rotational waiting time is required in the overwrite recording system. Furthermore, when certain information is already written to the optical memory medium 133 before a series of writing operations in the overwrite recording system, the data indicative of value "0" are written to the optical memory medium 133 by erasing this information therefrom. Accordingly, data can be efficiently written to the optical memory medium 133 without erasing the already written information therefrom in advance.

Thus, it is possible to increase a capacity of the optical memory medium by using a converged light spot having a sufficiently small diameter. Further, it is possible to realize an optical pickup having a high transfer rate and a high writing efficiency.

In FIG. 11, light reflected on the optical memory medium 133 is incident to the signal detecting section 134. In the signal detecting section 134, for example, a magnetooptic signal, a focusing signal and a tracking signal are respectively detected from SHG light by using a differential method, an astigmatic method and a push-pull method. In this case, LD light is also incident to the signal detecting section 134 together with the SHG light. Both the SHG light and the LD light are superposed on the tracking detector 136 and the focusing detector 137. Numerical apertures with respect to the SHG light and the LD light are different from each other. A beam diameter of the LD light is set to be much larger than each of sizes of the tracking detector 136 and the focusing detector 137. Accordingly, no signal detection using the SHG light is prevented by the superposition of the SHG light and the LD light. Further, it is possible to use a filter 141 for transmitting the SHG light and interrupting the LD light so as to effectively prevent an influence of this superposition on signal detection using the LD light.

In the above embodiment, the SHG element shown in FIG. 2 is used as the second light source 103. However, it is possible to use various kinds of elements as the second light source 103 if each of these elements constitutes a wavelength converting element for generating light having a short wavelength. For example, an SHG element using Nd:YVO$_4$ instead of Nd:YAG as a laser medium can be used. In this case, it is possible to generate SHG light having a shorter wavelength such as about 457 nm so that the diameter of a converged light spot can be reduced. At this time, to efficiently obtain the SHG light, it is preferable to use the semiconductor laser 102 having high power and it is necessary to use KNbO$_3$ instead of KTP as a nonlinear optical crystal. In particular, the SHG light can be more efficiently obtained by setting cutting angles ($\theta$, $\phi$) of KNbO$_3$ to ($\theta = 90° \pm 1°$, $\phi \neq 40.6° \pm 5°$), or ($\theta \neq 63.8° \pm 5°$, $\phi = 90° \pm 1°$) to perform phase matching.

The SHG element shown in FIG. 2 is of a bulk internal resonator type and has a stable output so that it is preferable to use such an SHG element in the optical information recording and reproducing system. However, it is possible to use an SHG element of an external resonator type instead of the SHG element of the bulk internal resonator type when the optical information recording and reproducing system is made compact and light in weight.

In the above embodiment, only the SHG light is focused and formed as a focal point on the optical memory medium 133. However, similar to the SHG light, LD light may be also focused and formed as a focal point on the optical memory medium 133. In this case, it is necessary to superpose the SHG light and the LD light with high accuracy since the objective lens 132 is also stopped down with respect to the LD light until a limit of diffraction.

As mentioned above, in accordance with an optical information recording and reproducing system in the present invention, a light beam from a first light source capable of being directly modulated is superposed on light having a short wavelength and emitted from a second light source. Superposed light is emitted to record and reproduce optical information. In this case, an overwrite recording system is used in a writing operation of the optical information. In the overwrite recording system, data indicative of value "0" are equivalently written to an optical memory medium by erasing data therefrom. Accordingly, it is possible to efficiently record and reproduce the optical information at a high speed by using a converged light spot having a sufficiently small diameter.

In particular, when an intensity of the short wavelength light is set to a relatively large value about an erasing intensity level, it is not necessary to set an intensity of the light beam from the first light source to be large. Accordingly, the diameter of the converged light spot can be sufficiently reduced without any great influence of power of the light beam from the first light source, thereby increasing a capacity of the optical memory medium.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system for recording and reproducing optical information, comprising:
    a first light source capable of being directly modulated, emitting a first light beam having a first wavelength;
    a second light source for emitting a second light beam having a second wavelength which is shorter than the first wavelength; and
    a superposing means for superposing the emitted first light beam on the emitted second light beam to record and reproduce optical information,
    said system using an overwrite recording system in which a writing operation of data is performed by emitting the first light beam modulated by the first light source and superposing the modulated first light beam on the second light beam of the second wavelength light, and data indicative of value "0" are written to a memory medium by erasing data therefrom during said writing operation, and
    said second light source emits the second light beam at an erasing intensity level during said writing operations.

2. An apparatus for recording and reproducing optical information, comprising:
    a first light source capable of being directly modulated, emitting a first light beam having a first wavelength;
    a second light source for emitting a second light beam having a second wavelength which is shorter than the first wavelength; and
    a superposing means for superposing the emitted first light beam on the emitted second light beam to record and reproduce optical information,
    said system using an overwrite recording system in which a writing operation of data is performed by emitting the first light beam modulated by the first light source and superposing the modulated first light beam on the second light beam of the second wavelength light, and data indicative of value "0" are written to a memory medium by erasing data therefrom during said writing operation, and
    said second light source emits the second light beam at an erasing intensity level during said writing operations.

3. An apparatus for emitting light on a memory medium, comprising:
    a first light source for emitting modulated light having a first wavelength;
    a second light source for emitting a second light beam which is unmodulated and having a second wavelength which is shorter than the first wavelength; and
    superposing means for superposing the emitted first light beam on the emitted second light beam to form a third light beam which is emitted on the memory medium.

4. An apparatus according to claim 3, wherein the first light source emits the first light beam having the first wavelength of approximately 808 nm.

5. An apparatus according to claim 4, wherein the second light source emits the second light beam having the second wavelength approximately 532 nm.

6. An apparatus according to claim 3, wherein the second light source emits the second light beam having the second wavelength approximately 532 nm.

7. An apparatus according to claim 3, wherein a frequency of modulation of the first light beam is in the order of several MHz.

8. An apparatus according to claim 4, wherein a frequency of modulation of the first light beam is in the order of several MHz.

9. An apparatus according to claim 5, wherein a frequency of modulation of the first light beam is in the order of several MHz.

10. An apparatus according to claim 6, wherein a frequency of modulation of the first light beam is in the order of several MHz.

11. An apparatus according to claim 3, wherein the superposing means is also for biasing the first light beam on the second light beam such that the third light beam contains a modulated second light beam.

12. An apparatus according to claim 4, wherein the superposing means is also for biasing the first light beam on the second light beam such that the third light beam contains a modulated second light beam.

13. An apparatus according to claim 5, wherein the superposing means is also for biasing the first light beam on the second light beam such that the third light beam contains a modulated second light beam.

14. An apparatus according to claim 6, wherein the superposing means is also for biasing the first light beam on the second light beam such that the third light beam contains a modulated second light beam.

15. An apparatus according to claim 7, wherein the superposing means is also for biasing the first light beam on the second light beam such that the third light beam contains a modulated second light beam.

16. An apparatus according to claim 8, wherein the superposing means is also for biasing the first light beam on the second light beam such that the third light beam contains a modulated second light beam.

17. An apparatus according to claim 9, wherein the superposing means is also for biasing the first light beam on the second light beam such that the third light beam contains a modulated second light beam.

18. An apparatus according to claim 10, wherein the superposing means is also for biasing the first light beam on the second light beam such that the third light beam contains a modulated second light beam.

* * * * *